(12) United States Patent
Rippelmeyer et al.

(10) Patent No.: US 12,347,902 B2
(45) Date of Patent: Jul. 1, 2025

(54) MULTIPLE FUEL CELL RADIATOR SYSTEM

(71) Applicant: TOYOTA MOTOR ENGINEERING & MANUFACTURING NORTH AMERICA, INC., Plano, TX (US)

(72) Inventors: Luke A. Rippelmeyer, Plano, TX (US); Yohei Okamoto, Plano, TX (US); Daniel Charles Folick, Long Beach, CA (US); Jared Farnsworth, Gardena, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 639 days.

(21) Appl. No.: 17/545,264

(22) Filed: Dec. 8, 2021

(65) Prior Publication Data
US 2023/0178774 A1     Jun. 8, 2023

(51) Int. Cl.
| | |
|---|---|
| *H01M 8/04746* | (2016.01) |
| *B60K 11/04* | (2006.01) |
| *B60L 58/33* | (2019.01) |
| *H01M 8/04007* | (2016.01) |
| *H01M 8/04029* | (2016.01) |
| *H01M 8/0438* | (2016.01) |
| *H01M 8/04701* | (2016.01) |

(52) U.S. Cl.
CPC ......... *H01M 8/04768* (2013.01); *B60K 11/04* (2013.01); *B60L 58/33* (2019.02); *H01M 8/04029* (2013.01); *H01M 8/04074* (2013.01); *H01M 8/04417* (2013.01); *H01M 8/04701* (2013.01); *H01M 2250/20* (2013.01)

(58) Field of Classification Search
CPC ......... H01M 8/04768; H01M 8/04029; H01M 8/04074; H01M 8/04417; H01M 8/04701; H01M 8/04358; H01M 8/04992; H01M 8/04007; H01M 8/04082; H01M 8/04067; H01M 8/04485; H01M 8/04723; H01M 8/04813; H01M 8/04313; H01M 2250/20; B60K 11/04; B60K 11/02; B60K 2001/005; B60L 58/33; B60L 1/003; B60L 3/0053
See application file for complete search history.

(56) References Cited

U.S. PATENT DOCUMENTS

| | | | |
|---|---|---|---|
| 8,822,093 B2 | 9/2014 | Kim | |
| 2007/0248861 A1 | 10/2007 | Hoshi | |
| 2013/0171536 A1* | 7/2013 | Cerceau | H01M 8/04029 |
| | | | 429/437 |
| 2019/0165395 A1 | 5/2019 | Folick | |
| 2021/0268892 A1* | 9/2021 | Kawabe | B60K 11/02 |

* cited by examiner

*Primary Examiner* — Matthew W Van Oudenaren
(74) *Attorney, Agent, or Firm* — SHEPPARD, MULLIN, RICHTER & HAMPTON LLP; Daniel N. Yannuzzi

(57) ABSTRACT

Systems and methods are provided for monitoring and controlling pump speeds to maintain a balanced pressure drop between each of the multiple fuel cell systems or circuits. In systems where a single radiator is used to maintain desired temperatures of multiple fuel cells, back flow can nevertheless be avoided. Control maps may be used to meet minimum pump speeds as a function of a flow splitting valve position and target flow rate (to prevent or avoid fluid back flow through a fuel cell stack). Control maps may also be used to determine a minimum pump speed as a function of three-way valve position (to prevent fluid back flow across a radiator path).

11 Claims, 7 Drawing Sheets

FIG. 3A

Table 300 — Minimum Allowed WP Speed [rpm]

| RV Position [%] | WP Flow Rate Target [rpm] | | | | | | | | |
|---|---|---|---|---|---|---|---|---|---|
| | 0 | 25 | 50 | 75 | 100 | 125 | 150 | 175 | 200 |
| 0 | 0 | 777 | 1406 | 2119 | 2764 | 3412 | 4087 | 4742 | 5000 |
| 1 | 0 | 778 | 1406 | 2119 | 2765 | 3413 | 4088 | 4743 | 5000 |
| 5 | 0 | 779 | 1407 | 2121 | 2767 | 3416 | 4091 | 4747 | 5000 |
| 10 | 0 | 846 | 1456 | 2158 | 2796 | 3406 | 4058 | 4698 | 5000 |
| 20 | 0 | 858 | 1470 | 2173 | 2818 | 3426 | 4083 | 4727 | 5000 |
| 30 | 0 | 965 | 1545 | 2220 | 2854 | 3437 | 4073 | 4700 | 5000 |
| 40 | 0 | 1096 | 1658 | 2283 | 2887 | 3444 | 4068 | 4678 | 5000 |
| 50 | 716 | 1281 | 1830 | 2366 | 2934 | 3481 | 4099 | 4702 | 5000 |
| 60 | 1081 | 1474 | 1993 | 2455 | 3029 | 3576 | 4181 | 4776 | 5000 |
| 70 | 1217 | 1619 | 2081 | 2544 | 3116 | 3669 | 4258 | 4844 | 5000 |
| 80 | 1321 | 1730 | 2162 | 2637 | 3196 | 3755 | 4330 | 4919 | 5000 |
| 90 | 1430 | 1838 | 2258 | 2752 | 3300 | 3878 | 4445 | 5000 | 5000 |
| 100 | 1507 | 1903 | 2318 | 2826 | 3366 | 3948 | 4515 | 5000 | 5000 |

FIG. 3B

Table 302

| Minimum Allowed WP Speed [rpm] | RV Position [%] | | | | | | | | | | | | |
|---|---|---|---|---|---|---|---|---|---|---|---|---|---|
| | 0 | 1 | 5 | 10 | 20 | 30 | 40 | 50 | 60 | 70 | 80 | 90 | 100 |
| | 0 | 0 | 0 | 3168 | 3209 | 3285 | 3111 | 2613 | 2197 | 1954 | 1801 | 1689 | 1639 |

MULTIPLE FUEL CELL RADIATOR SYSTEM

TECHNICAL FIELD

The present disclosure relates generally to fuel cell systems, and in particular to controlling a temperature via a fluid that flows through fuel cell stacks of a multiple fuel cell circuit and a shared radiator.

DESCRIPTION OF RELATED ART

Many vehicles are electric/electrified vehicles or, in other words, vehicles that have an electrified powertrain. The typical electrified vehicle has a more or less traditional drivetrain that includes one or more wheels, as well as a transmission, a differential, a drive shaft and the like, to which the wheels are mechanically connected. However, in place of an engine, the electrified vehicle includes one or more motors/motor-generators. As part of the electrified powertrain, the drivetrain is mechanically connected to the one or more motors/motor-generators. In conjunction with the drivetrain, the motors/motor-generators are operable to power the wheels using electrical energy. More and more such electrified vehicles are fuel cell vehicles (FCVs), or electrified vehicles that include one or more fuel cell stacks. In FCVs, the fuel cell stacks are operable to generate the electrical energy used by the motors/motor-generators to power the wheels.

BRIEF SUMMARY OF THE DISCLOSURE

In accordance with one embodiment, a method may comprise determining minimum pump speeds at which first and second pumps of a cooling system may operate to prevent backflow in the cooling system. The method may further comprise determining amounts by which first and second flow splitting valves of the cooling system may be opened to, in conjunction with the first and second pumps, prevent backflow in the cooling system. The amounts by which the first and second flow splitting valves may be opened are determined by estimating operating states of components of the cooling system including the first and second pumps and the first and second flow splitting valves, and back-calculating for the amounts based on mathematical representations of each component of the cooling system. Further still, the method may comprise operating the first and second pumps at the determined minimum pump speeds and operate the first and second flow splitting valves in accordance with the determined opening amounts.

In some embodiments, determining the minimum pump speeds is based upon first and second control maps.

In some embodiments, the first control map comprises a mapping of minimum allowed pump speeds as a function of flow splitting valve position and target flow rate to prevent back flow in a fuel cell path of the cooling system.

In some embodiments, the second control map comprises a mapping of minimum allowed pump speed as a function of flow splitting valve position to prevent back flow in a radiator path of the cooling system.

In some embodiments, the radiator path comprises a single radiator common to at least two fuel cells.

In some embodiments, the back calculating comprises back calculating a pressure needed at an inlet of a corresponding one of the first and second pumps.

In some embodiments, the method may further comprise using the calculated pressure as a basis for solving a reverse mathematical representation of the corresponding one of the first and second pumps.

In some embodiments, the method may further comprise, adjusting the minimum pump speeds at which the first and second pumps of a cooling system may operate, and the amounts by which the first and second flow splitting valves of the cooling system may be opened based on feedforward and feedback control output values.

In accordance with one embodiment, a cooling system may comprise a state estimator receiving operating conditions of components of the cooling system, and estimating conditions at locations commensurate with the components of the cooling system. The cooling system may further comprise a state governor converting target state values corresponding to target states of the components of the cooling system to avoid or negate back flow in a path of the cooling system. The cooling system may comprise a feedforward and feedback control system outputting values adjusting the target state values. Further still, the cooling system may comprise drivers receiving the adjusted target state values and applying the adjusted target state values to the components.

In some embodiments, the components of the cooling system comprise a radiator, a first fuel cell system operating in parallel to the radiator, and a second fuel cell system operating in parallel to the radiator.

In some embodiments, the components of the cooling system further comprise first and second pumps pumping coolant through the first and second fuel cell systems, respectively.

In some embodiments, the components of the cooling system further comprise first and second flow rate splitting valves, opening amounts of which influence minimum allowed speeds at which the first and second pumps respectively pump the coolant.

In some embodiments, the feedforward and feedback system comprises a state observer component reducing state value estimation error by determining a difference between an estimated state value of each of the components from the state estimator and a detected state value of each of the components, and adjusting the estimated state value to be closer to the detected state value.

In some embodiments, the feedforward and feedback system converts the adjusted target state values to corresponding actuator commands controlling operation of the components of the cooling system.

In accordance with one embodiment, a system may comprise a processor, and a memory including instructions that when executed, cause the processor to: determine minimum pump speeds at which first and second pumps may operate to prevent backflow in the cooling system, the first and second pumps pumping coolant through first and second fuel cell systems; determine amounts by which first and second flow splitting valves of the first and second fuel cell systems, respectively, may be opened to, in conjunction with the first and second pumps, prevent backflow within paths of the system defined relative to a single common radiator through which the coolant passes; wherein the amounts by which the first and second flow splitting valves may be opened are determined by estimating operating states of the first and second pumps and the first and second flow splitting valves, and back-calculate for the amounts based on mathematical representations of each of the first and second pumps, the first and second flow splitting valves, and the radiator; and operate the first and second pumps at the determined minimum pump speeds and operate the first and second flow splitting valves in accordance with the determined opening amounts.

In some embodiments, the instructions that when executed cause the processor to determine the minimum pump speeds, further cause the processor to determine the minimum pump speeds based on a first control map comprising a mapping of minimum allowed pump speeds as a function of flow splitting valve position and target flow rate to prevent back flow.

In some embodiments, the instructions that when executed cause the processor to determine the minimum pump speeds, further cause the processor to determine the minimum pump speeds based on a second control map comprising a mapping of minimum allowed pump speed as a function of flow splitting valve position to prevent back flow in a radiator path of the cooling system.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A illustrates an example control map for determining a minimum allowable pump speed as a function to pump flow rate target and flow splitting valve position.

FIG. 3B illustrates an example control map correlating a minimum allowed speed of operation for a plump such that the second fuel cell system does not experience negative or back flow to/through a radiator path.

The figures are not exhaustive and do not limit the present disclosure to the precise form disclosed.

DETAILED DESCRIPTION

Many fuel cell vehicles or FCVs include a fuel cell stack that includes multiple fuel cells. The fuel cells may receive a fuel, which typically includes hydrogen, along with oxygen or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle as alluded to above. It is desirable for fuel cells to operate within a predetermined temperature range. If the temperature is too low, the power output by the fuel cells may likewise be relatively low. If the temperature is too high, the fuel cells may dry out, damaging or destroying the fuel cells. Typically, a radiator is used to cool fluid or coolant that can be passed through a fuel cell circuit to effectuate cooling of the fuel cell.

Heavy duty trucks may be provided with multiple fuel cells in order to meet the power demands associated with towing a tractor, facilitating drayage transport, etc. Although certain vehicles, such as these heavy duty trucks, operate using multiple fuel cells, only a single radiator system is provided to handle the cooling needs of the multiple fuel cells. The use of multiple radiators is typically avoided as being inefficient. However, different fuel cells may be operating at/with different load conditions. Accordingly, each of the different fuel cells may have different cooling needs based on the heat loads that result from the different load conditions. The different cooling needs may also ultimately lead to the buildup/existence of different pressure levels throughout different sections of the fuel cell/radiator circuit. This can lead to the potential for undesirable back flow conditions.

Thus, various embodiments are directed to systems and methods for monitoring and controlling pump speeds to maintain a balanced pressure drop between each of the multiple fuel cell systems or circuits. In this way, despite only having a single radiator to maintain desired temperatures of multiple fuel cells, back flow can be avoided. Control maps may be used to meet minimum pump speeds as a function of a three-way/flow splitting valve position and target flow rate (to prevent or avoid fluid back flow through a fuel cell stack), and determine a minimum pump speed as a function of three-way valve position (to prevent fluid back flow across a radiator path).

Figure 1:
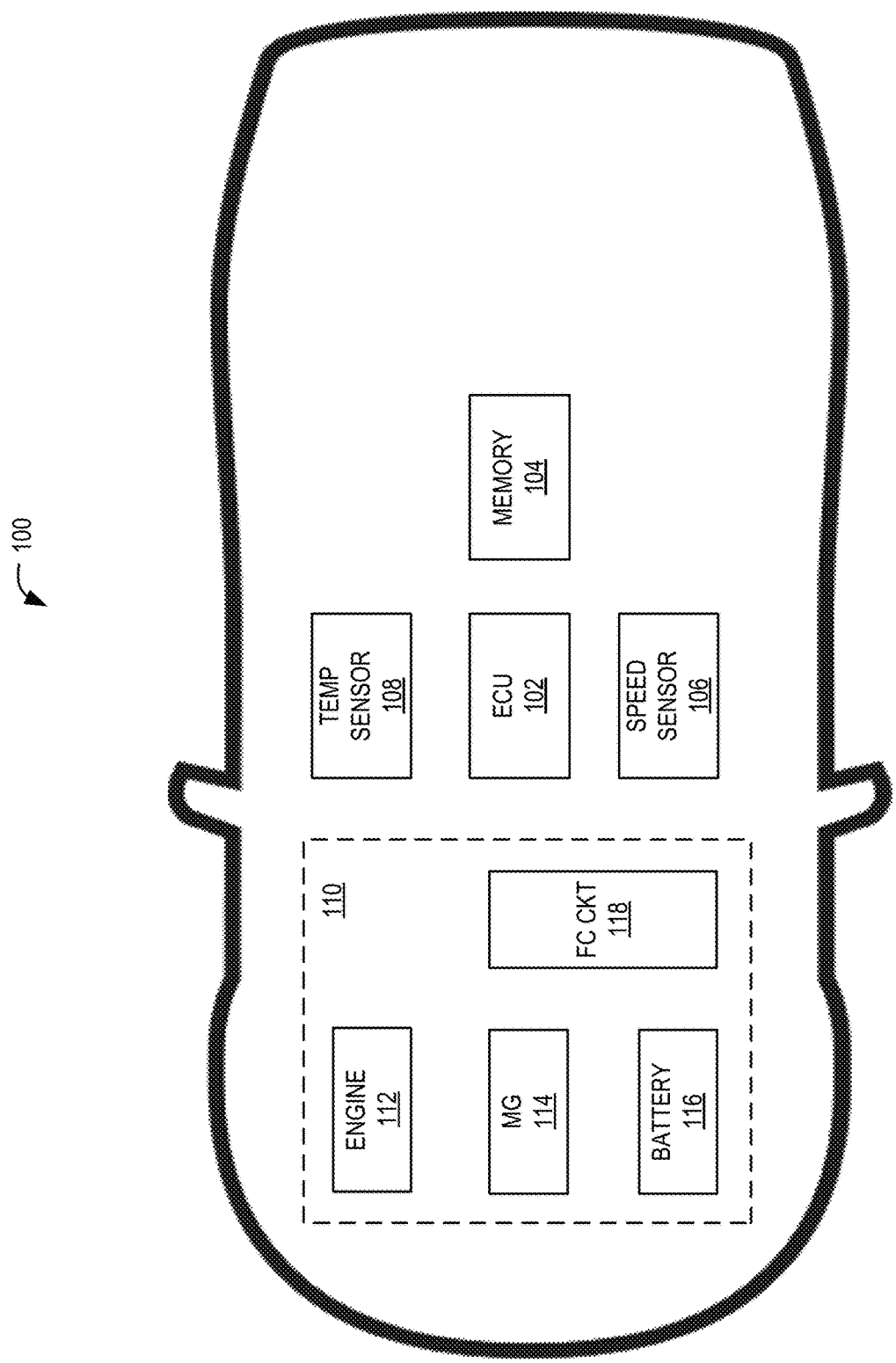
FIG. 1 is a schematic representation illustrating various components of a vehicle having a fuel cell circuit according to an embodiment of the present disclosure.

Turning to FIG. 1, an example vehicle 100 includes components for controlling a temperature of fuel cells of the vehicle 100. In particular, the vehicle 100 may include an ECU 102, a memory 104, a speed sensor 106, and a temperature sensor 108. The vehicle 100 may further include a power source 110 which may include at least one of an engine 112, a motor-generator 114, a battery 116, or a fuel cell circuit 118.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory known in the art. In that regard, the memory 104 may store machine-readable instructions usable by the ECU 102 and may store other data as requested by the ECU 102.

The speed sensor 106 may be any speed sensor capable of detecting data usable to determine a speed of the vehicle 100. For example, the speed sensor 128 may include a GPS sensor or an IMU sensor. The speed sensor 128 may also or instead include an angular velocity sensor configured to detect an angular velocity of the wheels of the vehicle 100 or the engine, a speedometer, or the like.

The temperature sensor 108 may include one or more temperature sensor capable of detecting data usable to determine an ambient temperature within a portion of the vehicle 100 or outside of the vehicle 100. For example, the temperature sensor 108 may include a thermocouple, a thermometer, an infrared temperature sensor, a thermistor, or the like.

The engine 112 may convert a fuel into mechanical power. In that regard, the engine 112 may be a gasoline engine, a diesel engine, or the like.

The battery 116 may store electrical energy. In some embodiments, the battery 116 may include any one or more energy storage device including a battery, a fly-wheel, a super-capacitor, a thermal storage device, or the like.

The fuel cell circuit 118 may include a plurality of fuel cells that facilitate a chemical reaction to generate electrical energy. In that regard, the electrical energy generated by the fuel cell circuit 118 may be stored in the battery 116. In some embodiments, fuel cell circuit 118 of vehicle 100 may comprise a plurality of fuel cell stacks/circuits.

The motor-generator 114 may convert the electrical energy stored in the battery (or electrical energy received directly from the fuel cell circuit 118) into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100. In some embodiments, the motor-generator 114 may also or instead include a turbine or other device capable of generating thrust.

Figure 2:
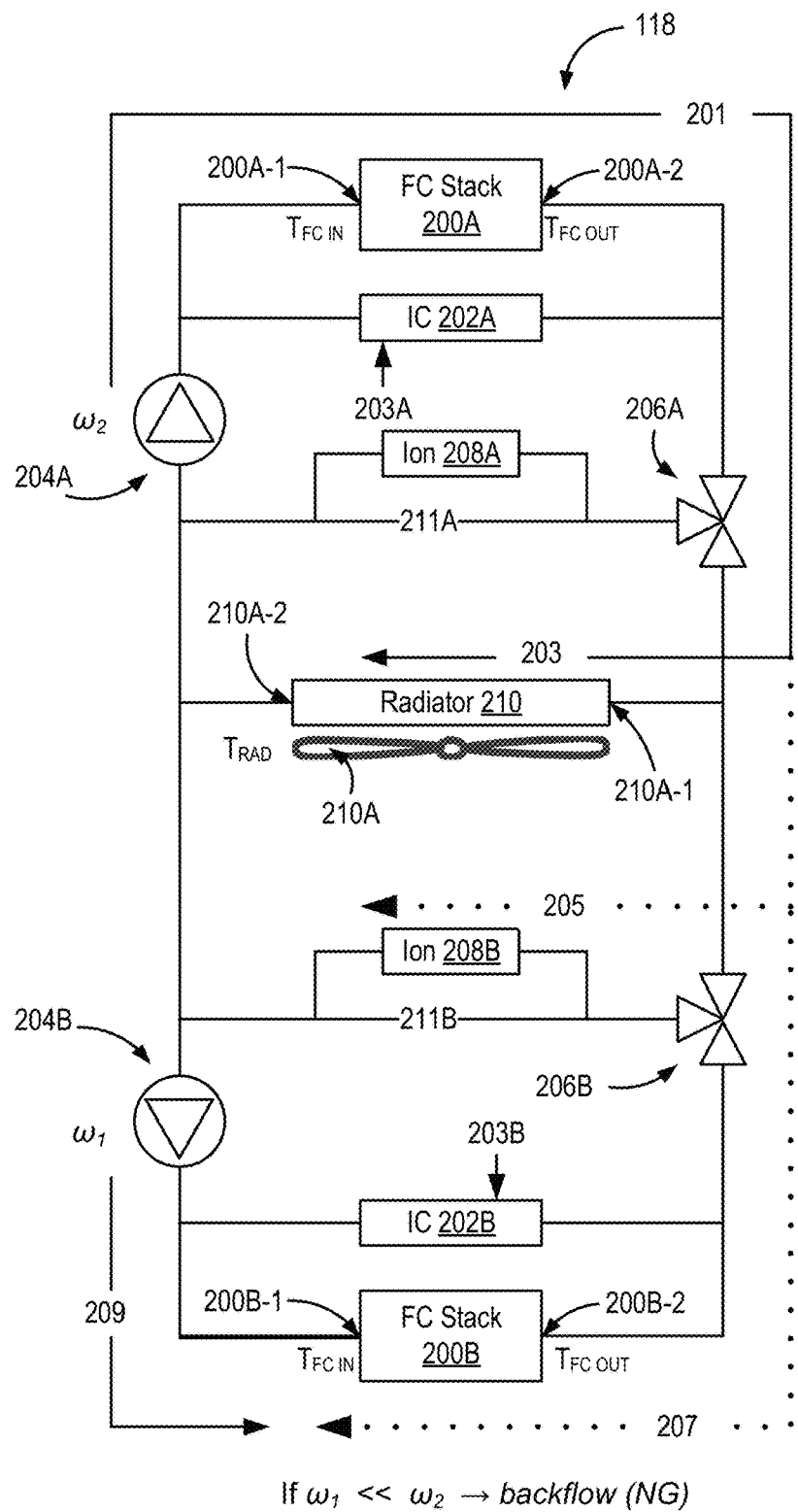
FIG. 2 is a schematic representation illustrating various features of the fuel cell circuit of FIG. 1 according to an embodiment of the present disclosure.

Turning now to FIG. 2, additional details of fuel cell circuit 118 are illustrated and described herein. The fuel cell circuit 118 includes first and second fuel cell stacks 200A and 200B, each having a plurality of fuel cells. The fuel cells may each facilitate a chemical reaction to generate electricity. The reaction may generate heat. Furthermore, a fluid may flow through the fuel cell stacks 200A/B and may transfer at least some of the heat away from fuel cell stacks 200A/B. In that regard, each of fuel cell stacks 200A/B may include an inlet 200A-1 and 200B-1, respectively, for receiving the fluid, and respective outlets 200A-2 and 200B-1, through which the fluid exits fuel cell stacks 200A/B.

As alluded to above, it may be desirable for the fuel cell stacks 200A/B to operate within respective (desired/determined) temperature ranges. For example, it may be desirable for the fuel cells of the fuel cell stacks 200A/B to operate between 50 degrees Celsius (50 degrees C., 122 degrees Fahrenheit (122 degrees F.)) and 80 degrees C. (176 degrees F.). Fuel cell stacks 200A/B may generate more electrical energy at relatively high temperatures (i.e., when the temperature is closer to 80 degrees C. than 50 degrees C.). However, fuel cell stacks 200A/B may undesirably lose moisture (i.e., may dry out) when operated at these relatively high temperatures. In that regard, it may be desirable for the fuel cell stacks 200A/B to operate closer to 80 degrees C. when a relatively large amount of electrical energy is requested, and closer to 50 degrees C. when a relatively small amount of electrical energy is requested. The fuel cell circuit 118 includes various features for increasing or decreasing the temperature of the fuel cell stacks 200A/B.

The fuel cell circuit 118 may further include intercoolers 202A and 202B associated with fuel cell stacks 200A and 200B, respectively. Intercoolers 202A/B may be oriented in parallel with their respective fuel cell stack 200A/B. Intercoolers 202A/B may receive a hot airflow 203A or 203B (i.e., an airflow having a greater temperature than the temperature of the fluid within the respective intercooler 202A/B) and may transfer heat from the hot airflow 203A/B to the fluid. Accordingly, the fuel cell stacks 200A/B and the intercoolers 202A/B may be considered heating elements of the fuel cell circuit 118 as they both increase the temperature of the fluid. All of the fluid within the fuel cell circuit 118 eventually flows through the combination of the fuel cell stack 200 and the intercooler 202 as shown by an arrows 102, 203, 205, 207, and 209. As will be discussed in greater detail below, when multiple fuel cell stacks, e.g., fuel cell stacks 200A and 200B, share a common radiator, e.g., radiator 210, back flow can occur as a result of the pressure differential being in the opposite direction. In FIG. 2, arrows 205, 207, and 209 illustrates flow areas where back flow can occur.

The fuel cell circuit 118 may further include three-way valves 206A and 206B (also referred to as flow splitting valves) serving each portion (corresponding to fuel cell stacks 200A and 200B) of fuel cell circuit 118. The fuel cell circuit 118 also includes radiator 210 that, as alluded to above, is common to both portions of fuel cell circuit 118. Bypass branches 211A and 211B allow fluid to bypass radiator 210. Three-way valves 206A and 206B may divide the fluid between radiator 210 and the bypass branch 211A based on a valve position of the three-way valve 206A. Likewise, three-way valve 206B may divide the fluid between radiator 210 and bypass branch 211B. Each of three-way valves 206A/B may have multiple valve positions each dividing the flow between their respective bypass branches 211A/B and common radiator 210 at different ratios.

For example, the three-way valve 206A may have a first position in which 80 percent (80%) of the fluid flows through the bypass branch 211A (from three-way valve 206A past ionizer 208A (described below) and towards pump 204A) and 20% of the fluid flows through radiator 210 (as shown by arrow 203). The three-way valve 206A may further have a second position in which 70% of the fluid flows through the bypass branch 211A and 30% of the fluid flows through radiator 210. The three-way valve 206A may have multiple discrete valve positions or may have infinite continuous valve positions (i.e., may direct any value between 0% and 100% of the fluid through each of the bypass branch 211A or the radiator 210). Likewise, three-way valve 206B may have multiple discrete valve positions or may have infinite continuous valve positions (i.e., may direct any value between 0% and 100% of the fluid through each of the bypass branch 211B or the radiator 210).

Any fluid that flows through a bypass branch 211A/B may avoid the radiator 210, thus allowing a majority of heat within the fluid to remain in the fluid. Ionizers 208A and 208B may receive some of the fluid that flows through respective bypass branches 21AA/B. Ionizers 208A/B may function as an ion exchanger and may remove ions from the fluid to reduce conductivity. In that regard, ionizers 208A/B may be referred to as de-ionizers.

Radiator 210 may transfer heat away from the fluid to a gas (such as air) flowing over or past radiator 210. In that regard, radiator 210 may be referred to as cooling elements of the fuel cell circuit 118. A fan 210A may be oriented in such a manner as to direct a flow of gas 219 over the radiator 210. Radiator 210 has a fluid inlet 210A-1 in which the fluid flows into radiator 210 and a fluid outlet 210A-2 in which the fluid flows out of radiator 210. Radiator 210 may further include an air inlet and an outlet (neither shown) that receives the gas (i.e., airflow) from the fan 210A and from which the airflow exits radiator 210. Ultimately, three-way valves 206A/B control how much coolant is needed from the fuel cell stack outlet (200A-2/200B-2) and from radiator 210 to meet a target temperature at the inlet of fuel cell stacks 200A/B. The aforementioned bypass branches 211A/B allows some amount of coolant to bypass radiator 210 so coolant actually output from radiator 210 can mix with the coolant that bypassed radiator 210 to arrive at the target fuel cell stack 200A inlet temperature. That is, the delta temperature across a fuel cell stack is to be controlled whereby coolant or fluid enters the fuel cell stack inlet at a cooler temperature, electricity is generated by the fuel cell stack (thereby also generating heat which is transferred to the coolant/fluid). Thus, as coolant passes through a fuel cell stack, it heats up. The delta temperature can be thought of as a function of how quickly coolant or fluid is flowing (i.e., mass flow rate through the fuel cell stack). In fuel cell circuit 118, the flow splitting vales 206A/B control flow independent of one another, creating a challenge for controlling conditioning, e.g., cooling of fluid or coolant in fuel cell circuit 118, which involves actively controlling how much fluid or coolant is being split (at the flow splitting valves 206A/B) and how much coolant/coolant flow rate fuel cell circuit 118 achieves to control each fuel cell system. In this way, the temperature at the inlet of a fuel cell stack and the delta temperature across a fuel cell stack can be controlled by controlling the flow rate through the fuel cell stack and how much coolant/fluid is being split between respective bypass branches 211A/B and radiator 210.

Fuel cell circuit 118 may further include pumps 204A and 204B. Pumps 204A/B may include any pump capable of forcing the fluid through the fuel cell circuit 118. For example, pumps 204A/B may include a hydraulic pump, a diaphragm pump, a piston pump, a rotary gear pump, or the like.

The fuel cell circuit 118 may further include two temperature sensors per fuel cell system (not shown, but whose sensed data, indicated as $T_{FC\_IN}$ and $T_{FC\_OUT}$ per fuel stacks 200A/B), and a temperature sensor measuring the radiator output temperature (indicated as $T_{RAD}$). As suggested by the reference names, temperature sensors may detect the temperature of the fluid entering and exiting each of fuel cell stacks 200A/B at their respective inlets 200A-1/200B-1 and at their respective outlets 200A-2/200B-2. The temperature sensor sensing $T_{RAD}$ may detect the temperature of the combined fluid exiting radiator 210. In some embodiments, greater or fewer temperature sensors may be used, and the temperature sensors may be positioned at additional or alternative locations, although some embodiments described herein are capable for performing cooling functions with only fuel cell inlet/outlet temperature sensors and the radiator output temperature sensor.

Referring again to FIGS. 1 and 2, the ECU 102 may determine a target temperature of the fuel cell stacks 200A/B based on a received power request of the vehicle 100. As described above, it may be desirable for the temperature of the fuel cell stacks 200A/B to increase when a relatively large amount of power is requested from the fuel cell stacks 200A/B. This is because the increased temperature corresponds to an increased power output of the fuel cell stacks 200A/B. Likewise, it may be desirable for the temperature of the fuel cell stacks 200A/B to decrease when a relatively small amount of power is requested from the fuel cell stacks 200A/B in order to retain moisture in the fuel cell stacks 200A/B.

The ECU 102 may also receive the detected temperatures, and may then control the actuators of the fuel cell circuit 118 (the three-way valves 206A/B, the fan 210A, and the pumps 204A/B) to cause the temperature of the fuel cell stacks 200A/B to increase or decrease. The ECU 102 may cause the temperature to increase or decrease towards the target temperature based on the target temperature and the detected temperatures.

Three-way valves 206A/B may be used to adjust the temperature of the fluid by directing more of the fluid through a bypass branch 211A/B or through radiator 210. For example, if the three-way valve 206A increases a flow of the fluid through the bypass branch 211A, then the overall temperature of the fluid may increase because it is directed back towards the heating elements without significant loss of heat. Similarly, if the three-way valve 206A increases a flow of the fluid through radiator 210 then the overall temperature of the fluid may decrease because more fluid is directed through radiator 210 where thermal energy may be removed from the fluid. It should be understood that control of three-wave/flow splitting valves 206A/B can be based on knowledge of flow resistance, which can be a function of the properties of the pipes/lines in fuel cell circuit 118, e.g., physical dimensions such as length, the amount of resistance/friction, and mass flow rate through the pipes/lines. Although in each system, these properties may be known, they are unknown to each other.

The fan 210A may likewise be used to adjust the temperature of the fluid by increasing or decreasing the flow of gas over radiator 210. For example, if the speed of the fan 210A is increased (resulting in a greater quantity of gas flowing over radiator 210) then the temperature of the fluid may decrease as more thermal energy is transferred out of the fluid. Similarly, if the speed of the fan 210A is decreased, then the temperature of the fluid may increase as less thermal energy is transferred out of the fluid.

Pumps 204A/B may also be used to indirectly adjust the temperature of the fluid by increasing or decreasing a flow rate, such as a mass flow rate, of the fluid through the fuel cell circuit 118. As the flow rate increases, heat transfer between the fluid and the various components increases, which may result in an increase or decrease in temperature based on how much of the fluid flows through the bypass branch(es) 211A/B or radiator 210, and based on a temperature of the fuel cell stacks 200A/B. Thus, the temperature of the fluid may correspond to the flow rate of the fluid.

As noted above, embodiments are intended to control inlet fuel cell stack temperatures and the delta temperature (temperature difference between $T_{FC\_IN}$ and $T_{FC\_OUT}$) across a fuel cell stack, e.g., one or more of fuel cell stacks 200A/B. This control can be achieved by controlling flow rate through a fuel cell stack, and controlling how much coolant (fluid) is being split between radiator 210 and bypass 211A/B.

If, as in some conventional systems, only a single fuel cell system was implemented, all coolant would be flowing in the positive direction, and negative/back flow would not be possible. For example, if the only fuel cell system was that including fuel cell stack 200A, fluid/coolant flow would always move in a direction from pump 204A towards three-way valve 206A, and on through radiator 210, and so on. However, with two fuel cell systems operating in parallel, pump 204A's pressure head could be greater than that of pump 204B's, resulting in negative flow through fuel cell stack 200B's system, e.g., as illustrated by arrows 205, or 209, positive flow occurring at 201 and 203. It my also be the case that pumps 204A and 204B are different, pumps 204A and 204B may be controlled in different ways, or the respective fuel cell systems are asymmetrical (e.g., a pressure drop in one system is different from a pressure drop in the other system). That is, near any area(s) of asymmetry due to system component(s) or the way(s) in which a fuel cell system is controlled can lead to negative flow or back flow.

Positive flow refers to the flow of fluid, e.g., coolant, through an inlet and exiting an outlet. The pipes or lines of such systems are typically designed to promulgate flow in only one direction. Negative flow or back flow can refer to a condition or state where the flow is going against the configured direction. This can be the result of stagnated/stalled flow, where so much back pressure from one system/loop exists that the other loop is unable to induce/produce enough pressure to move fluid/coolant. For example, pumps 204A/B may be centrifugal pumps (which if spun at constant speed, but at increased pressure, results in less flow rate through the pump(s)). This means that if one system (that associated with fuel cell stack 200A) is causing higher pressure than fuel cell circuit 118 was designed for, pump 204B could spin at a desired target speed, but the flow rate would be less, sometimes much less, than desired. Again, back flow is causing increased pressure in the fuel cell system associated with fuel cell stack 200B such that pump 204B cannot make coolant flow at a desired flow rate because pump 204B is fighting against pressure (e.g., vis-à-vis the negative or back flow 207 where fluid or coolant is flowing from the outlet to the inlet of fuel cell stack 200B). This can be represented as a function of the respective speeds of pumps 204A/B, i.e., if $\omega_1 \ll \omega_2 \rightarrow$ back flow. If the system associated with fuel cell stack 200B were operating with positive flow, the flow of coolant or fluid would progress in a (counterclockwise) direction opposite that of 207 (following 209, through the inlet of fuel cell stack 200B, exiting the outlet, up through three-way valve 206B and past/through radiator 210 (as in the direction of 203). Ultimately, the cooling effect from radiator 210 can be less (sometimes much less) than desired/needed. As a further result, the target temperature delta control for fuel cell stack 200A may not be met because the coolant is not flowing properly.

As noted above, the challenges associated with controlling the flow splitting valves 206A/B (which operate independently of one another) and controlling the pumps 204A/B (again, which operate independently of one another) result in an inability to control inlet fuel cell stack temperature correctly (for each fuel cell stack 100A/B) using conventional methods. That is, conventional systems do not know how much coolant or fluid is being split between the common radiator 210 and respective bypass branches 211A/B to achieve a target inlet fuel cell stack temperature for each fuel cell stack 200A/B system.

Returning to operation of pumps 204A/B, it should be understood that in order to achieve a target mass flow rate to a fuel cell stack such as fuel cell stacks 200A/B, the speed of water pumps 204A/B must be set or configured accordingly. However, without knowing the flow resistance through common radiator 210, the actual pressure drop across a system, e.g., the fuel cell system associated with fuel cell stack 200B, that flow resistance cannot be compensated for. It should be understood that pumps 204A/B (for pumping water or some other fluid/coolant) are typically sensitive to pressure. Thus, if the pressure delta is much higher than expected, a much lower flow rate than desired is the result for a given pump speed. Moreover, and again, fuel cell circuit 118 typically does not include any flow or pressure sensors (only fuel cell inlet/outlet temperature sensors and a temperature sensor for sensing the output of fluid from radiator 210.

In light of the above, various embodiments implement logic that assumes that another (parallel) fuel cell system is operating in a worst case scenario. Thus, the controls for a first or reference fuel cell system are set to prevent back flow in a second fuel cell system sharing a common radiator to prevent back flow in accordance with the worst-case scenario assumption as will be described below.

FIG. 3A is an example control map 300 for determining a minimum allowable pump speed as a function to pump flow rate target (liters per minute) and flow splitting valve (RV) position (percentage open). It should be understood that 0% open can refer to a scenario where the flow splitting valve is fully closed to the radiator path, while 100% open can refer to a scenario/state where the flow splitting valve is fully open to the radiator path. It should be understood that control map 300 may be generated using models or simulation techniques, real-world testing, etc. and can be specific to a particular model of a vehicle, fuel cell circuit component grouping, simulation or testing conditions, etc. It can be assumed that a first fuel cell system, e.g., that associated with fuel cell stack 200A (FIG. 2) is operating in a worst-case state (with maximum fluid or coolant flow out of radiator 210). In order for a second fuel cell system, e.g., that associated with fuel cell stack 200B, to meet the flow rate target for fuel cell stack 200B, the minimum speed at which pump 204A must operate can be determined using control map 300. Basing minimum operating speed for pump 204A on control map 300 can ensure that fuel cell stack 200B is getting its desired flow rate. It should be noted that a less-than-desired flow rate is detrimental to operation fuel cell circuit 118, while a greater-than-desired flow rate is not detrimental.

FIG. 3B is an example control map 302 that correlates a minimum allowed speed of operation for pump 204B such that the second fuel cell system does not experience negative or back flow to/through the radiator path. Referring back to FIG. 2, the radiator path of fuel cell circuit 118 can refer to the path between three-way valve 206B and radiator 210. If fluid flow stagnates in the path of radiator 210, the inlet temperature ($T_{FC\_IN}$) at fuel cell stack 200B can begin to creep higher and higher. To counter this effect, the flow splitting valve 206B can be opened/opened further to increase mass flow rate to the radiator side, eventually achieving positive flow for the second fuel cell system.

The output from each of control maps 300 and 302 can be used to establish or set forth a lower limit saturation for a "final" or "ultimate" pump speed command or instruction. That is, if the pump speed is less than the backflow prevention minimum allowed pump speed, the pump speed is set to the backflow prevention minimum allowed pump speed. In this way, the backflow "threshold" is overcome.

As noted above, a second challenge to contend with in a multi-fuel cell stack system with a common radiator is addressing radiator path flow resistance error. In particular, the radiator path and bypass branch or path component properties are not known (fuel cell circuit 118 only including, e.g., temperature sensors at the outlet of radiator 210 and at the inlets and outlets of fuel cell stacks 200A/B. It should be further noted that total fluid/coolant mass flow rate through the common radiator 210 may also be unknown. Thus, the flow resistance estimate can have significant errors. In order to achieve accurate flow resistance estimates, embodiments leverage model-based control design, where physical equations are used to represent components of fuel cell circuit 118 along with a state estimator that predicts the state of components/at every relevant location of fuel cell circuit 118 (e.g., inlets, outlets, paths, etc.).

The above-noted state information and the inverse of the aforementioned physical equations (where the physical equations represent a first system (in one/forward direction) and the inverse can be used to represent the second, parallel system (in the opposite/backward direction) to effectuate control of fuel cell circuit 118. In this way, target values at particular areas in fuel cell circuit 118 (e.g., target pressure at a pump inlet) can be achieved by back-calculating the pressure needed at an inlet of a corresponding fluid/coolant pump (via the state estimator) and plugged into the reverse equation for that pump. In other words, state estimation and control are directly related, and thus, correct or accurate state estimates are needed to effectuate the correct or desired control.

As alluded to above, the first and second fuel cell systems associated with fuel cell stacks 200A/B, respectively, operate independently of one another, and flow resistance at radiator 210 is unknown. An accurate estimate for flow resistance results in the ability to determine/calculate the correct flow rate through bypass branches 211A/B and through common radiator 210. It should be understood that the flow resistance estimate further impacts flow splitting at valves 206A/B as well as operating speed of pumps 204A/B because, as will be discussed in greater detail below, equations for representing pumps 204A/B and valves 206A/B rely on knowledge of the flow resistance for each path. Thus, by correcting the estimate (from a state estimator), the feed forward control for pumps 204A/B as well as valves 206A/B can be improved. Such improvements can be achieved through the use of an observer function that looks at the error at a fuel cell inlet, and then algebraically solving for what the mass flow rate through an associated bypass branch would have be to based on the error The observer can then correct for that mass flow rate. Now that other "knowns" in the bypass branch are determined, total radiator flow resistance can be calculated and this can be used to correct the state estimator estimate.

Further to the above, a partial derivative feedback function can be added to remove any remaining error. An example of such partial derivative feedback control is disclosed in U.S. Pat. No. 10,720,655, which is assigned to the applicant of the present disclosure, and incorporated herein by reference in its entirety. In essence, embodiments disclosed herein are able to calculate the sensitivity, in real-time, of a three-way/flow splitting valve. A change in fuel cell inlet temperature (e.g., a 1 degree change) is a function of how much change occurs in flow resistance of a valve (a partial derivative of sensitivity).

By performing proportional integral derivative (PID) control, (where error is multiplied by some value, and the integral term is based on an accumulation of past error), gains are automatically calculated based on sensitivity of a system, thus allow operation in highly non-linear situations. That is, at times, a small change in value has a much larger impact. Embodiments of the present disclosure avoid the need to employ gain scheduling or having an array of gains, in contrast to convention solutions addressing such highly non-li near situations. Instead, use of the partial derivative allows for the capturing of non-linear relationships, and then using a constant gain, which reduces processing/computing complexity. It should be understood that while various embodiments are described in the context of fluid paths/systems, embodiments can be adapted for use in electrical systems as well, e.g., flow rate is akin to current, pressure differential is akin to voltage, and so on.

Figure 4:
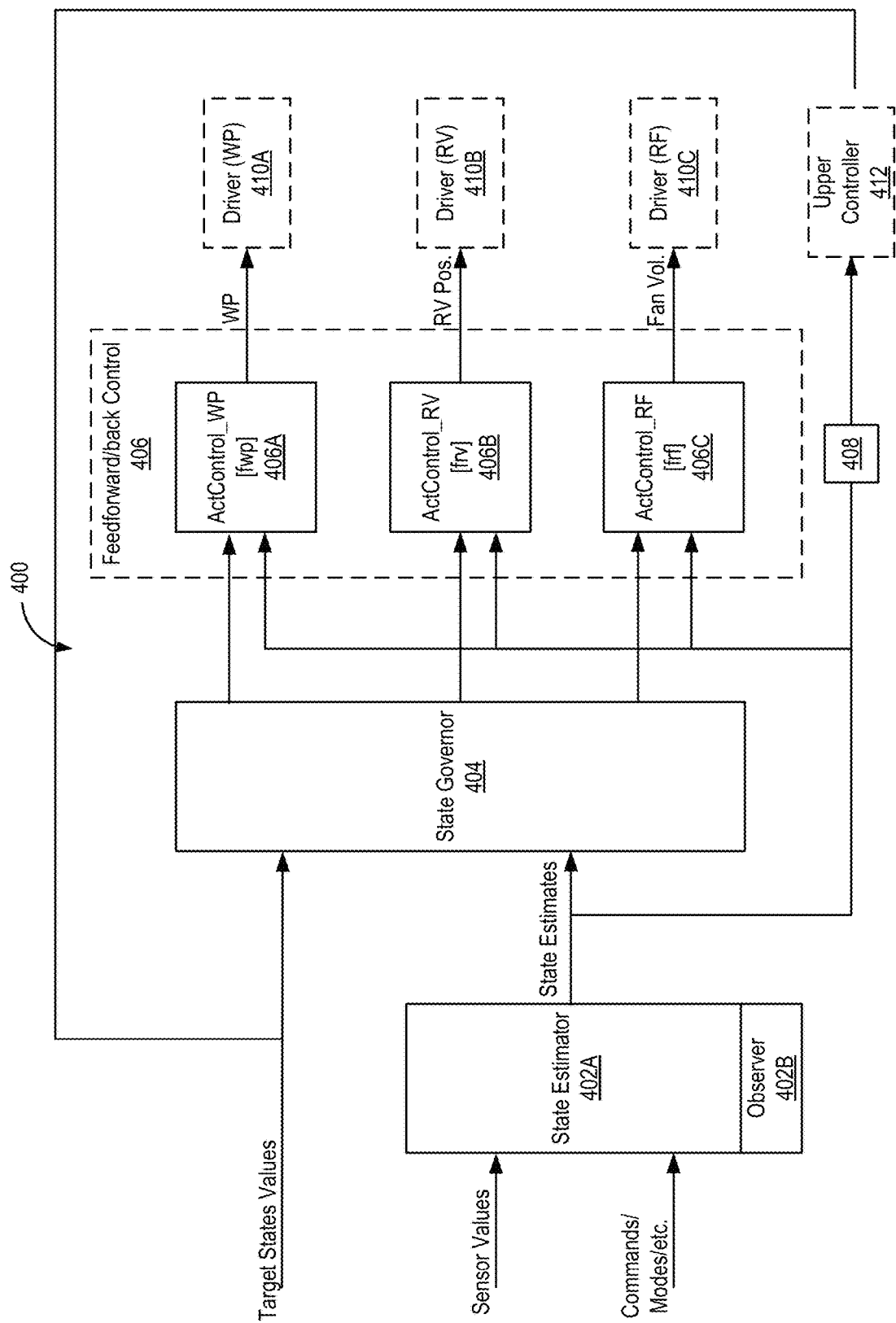
FIG. 4 is a flow chart illustrating example operations for controlling a cooling system comprising a common radiator in accordance with various embodiments of the present disclosure.

Referring now to FIG. 4, a control system 400 is illustrated. It should be noted that control system 400 may be implemented in/as part of ECU 102 (FIG. 1), e.g., using specifically designated hardware of the ECU 102, or using general hardware of the ECU 102.

As illustrated in FIG. 4, control system 400 may include a state estimator 402A and observer 402B, a state governor 404, feedforward and feedback control 406, a unit delay 408, drivers 410A-410C for controlling the respective components (also referred to as actuators) of fuel cell circuit 118 (pumps 204A/B, flow splitting valves 206A/B, and radiator fan 210A), and an upper controller 412. It should be understood that unit delay 408 can refer to a component or logic component (represented as 1/Z) that prevents an algebraic loop, where previous time step values from state estimator 402A are sent to upper controller 412.

State estimator 402A may receive inputs including sensor values and current actuator positions (or commanded actuator positions) and may estimate conditions at various locations/associated with various components of the fuel cell circuit 118. The sensor values may include, for example, temperatures detected from the respective inlet and outlet temperature sensors of each of fuel cell stacks 200A and 200B. The actuator positions may be received from the actuators themselves (pumps 204A/B, the three-way valves 206A/B, and radiator fan 210).

Observer for 402B may operate as feedback control for radiator 210. In that regard, observer 402B may determine a difference between a detected temperature at the outlet of radiator 210 and an estimated temperature at the outlet as determined by state estimator 402A. The observer 402B may then change values determined by the state estimator 402A to cause the estimated temperature to be closer in value to a detected temperature.

Upper controller 412 may receive a power request, at which point upper controller 412 may identify a target temperature of fuel cell stacks 200A/B based on the power request, e.g., to operate fuel cell stacks 200A/B in a manner that meets the power request. For example, if the power request is relatively large then the upper controller 412 may set a target temperature to be relatively high, such as 75 degrees C. (167 degrees F.). Likewise, if the power request is relatively small then the upper controller 412 may set a target temperature to be relatively low, such as 55 degrees C. (131 degrees F.). The upper controller 412 may then output an unfiltered target fuel cell temperature.

State governor 404 may convert or translate state target values into actuator values. For example, state governor 404 may receive the target fuel cell temperature, and can generally dictate how fast the temperature of the fluid in the fuel cell circuit 118 should respond to the temperature change request (i.e., how fast the temperature should increase or decrease). The state governor 404 may output a temperature rate of change corresponding to a desired rate of temperature change of the fluid (such as at the inlet or the outlet of one of fuel cell stacks 200A/B). For example, the temperature rate of change may be measured in degrees (e.g., degrees C.) per second.

As alluded to above, fuel cell circuit 118 includes relatively few sensors. Additional data may be desirable in order to provide optimal control of the actuators/components of fuel cell circuit 118. In that regard, state estimator 402A may calculate or predict the additional data (i.e., current conditions) based on the sensor values and the actuator positions or states. For example, the state estimator 402A may calculate or predict temperatures at locations of the fuel cell circuit 118 in which temperature sensors are not present. As another example, the state estimator 402A may calculate or predict pressure of the fluid at various locations of the fuel cell circuit 118. As yet another example, the state estimator 402A may further calculate or predict quantities of heat added to or subtracted from the fluid by the various elements of the fuel cell circuit 118. The state estimator 402A may output calculated or predicted values corresponding to current conditions of the fuel cell circuit 118.

Feedforward/back controller 406 operate to convert or transform actuator values to actuator commands that may be used by the actuators/components of fuel cell circuit 118. The feedforward control aspect in particular may operate to output feedforward control signals corresponding to the determined desired positions (or levels of actuation) of the actuators. For example, the feedforward control may receive a temperature rate of change from the state governor 404 along with the calculated or predicted values from the state estimator 402A. In some embodiments, the feedforward control may further receive detected temperatures from temperature sensors. Feedforward control may determine desired positions of the relevant actuators to achieve the desired temperature rate of change of the fluid of the fuel cell circuit 118. The feedforward control may determine these desired positions based on the received temperature rate of change and the calculated or predicted values. g to the determined desired positions (or levels of actuation) of the actuators.

The feedback aspect of feedforward/back control 406 may function to reduce the error between a measured or sensed parameter value and a desired or target parameter value. For example, the feedback control may also receive the temperature rate of change from the state governor 404 along with the calculated or predicted values from the state estimator 402A. In some embodiments, the feedback control may further receive the detected temperatures from the temperature sensors. The feedback control may identify whether the actuators are achieving the desired temperature rate of change. Thus, the feedback control may further generate feedback control signals that correspond to or reflect adjustments to the actuators to close the gap between a measured temperature rate of change and the desired temperature rate of change.

Actuator control 406A may receive the feedforward control signals and the feedback control signals generated by the feedforward/feedback controller 406 and in turn, generate actuator control signals based on the combination of the feedforward control signals and the feedback control signals 318. In some embodiments, the actuator control 406A may generate the actuator control signals by adding the feedforward control signals and the feedback control signals. One or more of the actuator control signals from 406A-406C may be transmitted to each of the actuators 410A-410C. For example, the actuator control signals may include a first signal that controls a valve position of the three-way valve 206A, a second signal that controls a fan speed of the fan 210A, and a third signal that controls a pump speed of the pump 204A.

State estimator 402A and control of three-way/flow splitting valves (RV) 406B are based on the same set of equations, where again, RV control 406B is the inverse of state estimator 402A application. State estimator 402A may calculate states for each component in fuel cell circuit 118 ($\Delta P$, $T$, $Z$, $\mu$, $\rho$, $\dot{m}$), which can be passed to RV control 406B to calculate a target flow splitting valve position. Below are key sets of equations used by state estimator 402A and RV control 406B.

$$\Delta P = Z\dot{m}^2 \text{(parallel paths)} \rightarrow \Delta P = \tag{1}$$

$$Z_{RD.EQ}\dot{m}_{RD}^2 = Z_{BP.EQ}\dot{m}_{BP}^2 \rightarrow \frac{\dot{m}_{RD}}{\dot{m}_{BP}} = \frac{\sqrt{Z_{BP.EQ}}}{\sqrt{Z_{RD.EQ}}},$$

where $Z_{RD.EQ} = Z_{RD} + Z_{RV.RD}$ & $Z_{BP.EQ} = Z_{PB} + Z_{RV.BP}$ $$r = \frac{(T_{BP} - T_{FCin})}{(T_{BP} - T_{RD})} = \frac{\dot{m}_{RD}}{\dot{m}_{Total}} = \frac{\dot{m}_{RD}}{\dot{m}_{RD} + \dot{m}_{BP}} = \tag{2}$$

$$\frac{1}{1 + \frac{\dot{m}_{BP}}{\dot{m}_{RD}}} = \frac{1}{1 + \frac{\sqrt{Z_{RD.EQ}}}{\sqrt{Z_{BP.EQ}}}} = \frac{1}{1 + \frac{\sqrt{Z_{RD} + Z_{RV.RD}}}{\sqrt{Z_{PB} + Z_{RV.BP}}}}, \text{ where}$$

$$Z_{RD/BP} = \frac{0.5\mu R_e}{2\rho A^2 D} \frac{F_d * L_e}{DA^2} + \frac{\xi}{A^2}, Z_{RV.RD/RV.BP} = \frac{\xi}{2\rho A^2}, \text{ and } R_e = \frac{\dot{m}D}{\mu A}$$

Figure 5:
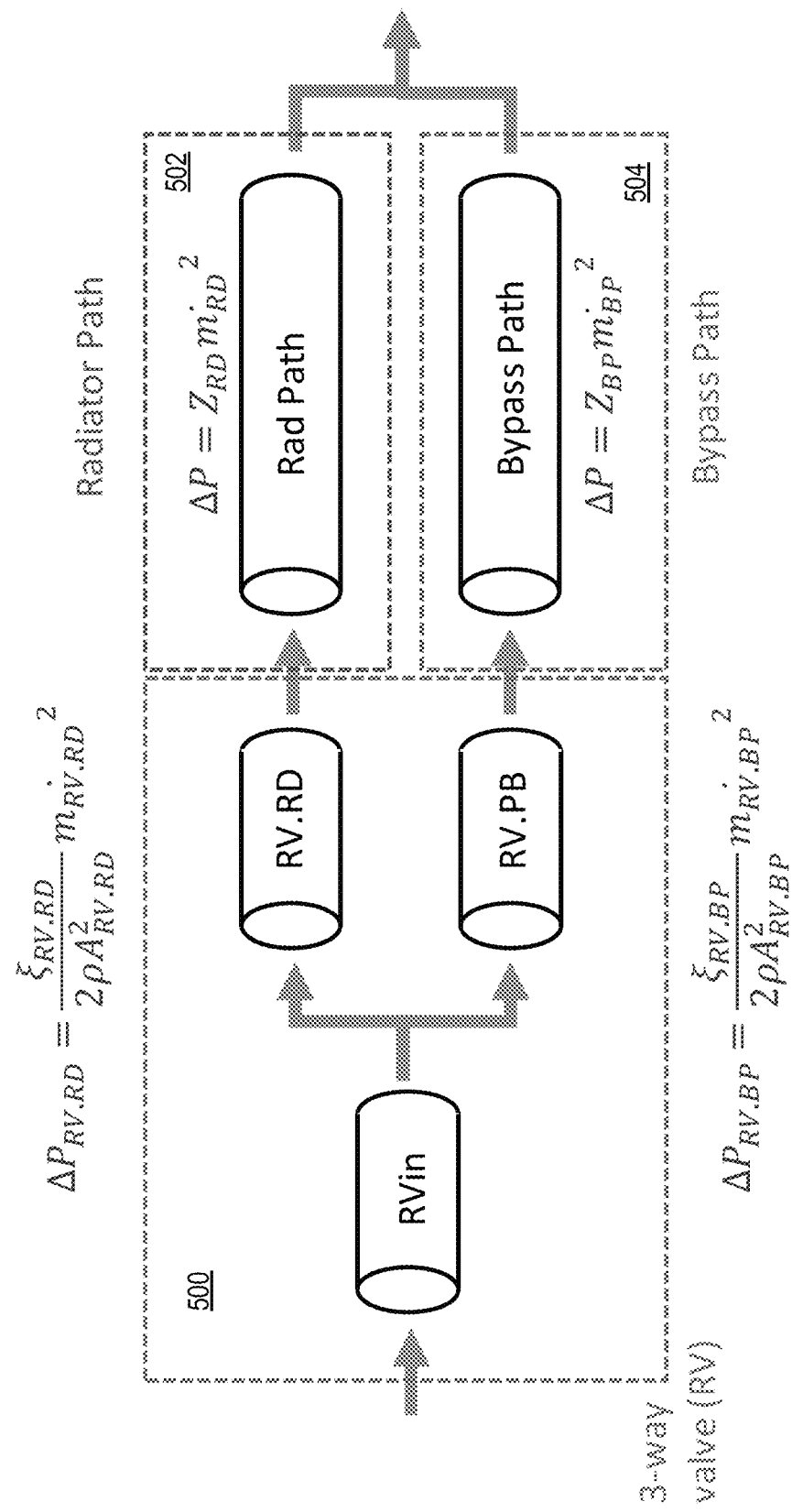
FIG. 5 illustrates physical equations that can be used to represent certain cooling system elements/aspects in accordance with some embodiments described in the present disclosure.

It should be understood that Z refers to flow resistance, and that $\Delta P$ refers to the pressure drop across a piping component such as a pump, e.g., pumps 204A/B. It should also be understood that flow splitting through valves e.g., flow splitting valves 206A/B, and corresponding pressure drop is a function of temperature, i.e., the ratio/fraction of the difference between temperature at a bypass branch/path and temperature at a fuel cell inlet and the difference between temperature at the bypass branch/path and the temperature at the radiator. Additionally, this pressure drop equates to mass flow rate ($\dot{m}$) and flow resistance. FIG. 5 further illustrates the physical equations representative of a three-way valve 500, radiator path 502, and bypass branch/path 504.

As previously noted, the radiator path and bypass path component properties are not known and therefore the flow resistance estimate can have significant error. In a situation where multiple, e.g., two, fuel cell systems are connected to a common radiator, the total coolant/fluid mass flow rate is also unknown. Below sets forth the RV control application of equations (frv).

$$RV \text{ Position } [\%] = \text{MAP } (\xi_{RV.RD}), \text{ where} \tag{3}$$

$$\xi_{RV.RD} = 2\rho A_{RV.RD}^2 \left( \left( \frac{1}{\frac{(T_{BP} - T_{FCintgt})}{(T_{BP} - T_{RD})}} - 1 \right)^2 \left( Z_{BP} + \left( \frac{\xi_{RV.BP(n-1)}}{2\rho A_{RV.BP}^2} \right) \right) - Z_{RD} \right)$$

To correct the error of state estimator 402A with observer 402B, the observer feedback function is as follows.

$$\dot{m}_{BP} = \dot{m}_{BP.est} + \dot{m}_{BP.FB} \tag{4}$$

The state estimator 402A solves for flow resistance at a bypass branch/path.

$$Z_{BP} = \left( \frac{0.5\mu \left( \frac{\dot{m}_{BP} D_{BP}}{\mu A_{BP}} \right)}{2\rho A_{BP}^2 D_{BP}} \frac{F_d * L_{e.BP}}{D_{BP} A_{BP}^2} + \frac{\xi_{BP}}{A_{BP}^2} \right) \tag{5}$$

The state estimator 402A solves for flow resistance at the radiator.

$$Z_{RD} = \left( \frac{1}{\left( \frac{\dot{m}_{BP}}{\dot{m}_{in}} \right)} - 1 \right)^2 (Z_{BP} + Z_{RV.BP}) - (Z_{RV.RD}) \tag{6}$$

Then, feedback is added to RV control (frv). The partial derivative feedback function is as follows.

$$Z_{BPFB} = k_p \Delta Z_{BPe} + k_I \int \Delta Z_{BPe} dt, \text{ where } \Delta Z_{BPe} = \Delta T_{FCin}\left(\frac{\partial Z_{BP}}{\partial T_{FCin}}\right) \quad (7)$$

Feedback and feedfoward flow resistance values are added to arrive at the final actuator command.

$$Z_{BP} = Z_{BP\_FF} + Z_{BP\_FB} \quad (8)$$

It should be noted that by using fuel cell inlet temperatures, the actual flow split ratio between the radiator path and a bypass branch/path can be calculated and used to correct the radiator path flow resistance estimation error.

Correcting the state estimator 402A estimate with observer 402B is accomplished via the below observer function ($\dot{m}_{BP}$). It should be noted that bypass flow rate, $\dot{m}_{BP}$, can be explicitly solved, but a fuel cell inlet temperature oscillation will occur due to a measurement time delay. A partial derivative feedback function is implemented to counteract this, where the feedback function is based on solving the fuel cell inlet temperature sensitivity ($\Delta T_{FCin}$) to bypass branch/path flow rate, $\Delta \dot{m}_{BP}$.

$$\dot{m}_{BP} = \dot{m}_{BP,est} + \dot{m}_{BP,FB}, \text{ where } \dot{m}_{BP,FB} = k_p \Delta \dot{m}_{BPe} + k_I \int \Delta \dot{m}_{BPe} dt, \quad (9)$$

$$\Delta \dot{m}_{BPe} = \Delta T_{FCin}\left(\frac{\partial \dot{m}_{BP}}{\partial T_{FCin}}\right), \Delta T_{FCin} = T_{FC_{inmes}} - T_{FCinest}, \& \frac{\partial \dot{m}_{BP}}{\partial T_{FCin}} =$$

$$\left(\dot{m}_{in} - \dot{m}_{in}\frac{(T_{BP} - T_{FCin})}{(T_{BP} - T_{RD})}\right) - \left(\dot{m}_{in} - \dot{m}_{in}\frac{(T_{BP} - (T_{FCin} - 1))}{(T_{BP} - T_{RD})}\right)$$

Next, the observer 402B can solve for bypass branch/path flow resistance as follows.

$$Z_{BP} = \left(\frac{0.5\mu\left(\frac{\dot{m}_{BP}D_{BP}}{\mu A_{BP}}\right)}{2\rho A_{BP}^2 D_{BP}} \frac{F_d * L_{e,BP}}{D_{BP} A_{BP}^2} + \frac{\xi_{BP}}{A_{BP}^2}\right) \quad (7)$$

Lastly, the observer 402B can solve for radiator flow resistance as follows.

$$Z_{RD} = \left(\frac{1}{\left(\frac{\dot{m}_{BP}}{\dot{m}_{in}}\right)} - 1\right)^2 (Z_{BP} + Z_{RV,BP}) - (Z_{RV,RD}) \quad (8)$$

Figure 6:
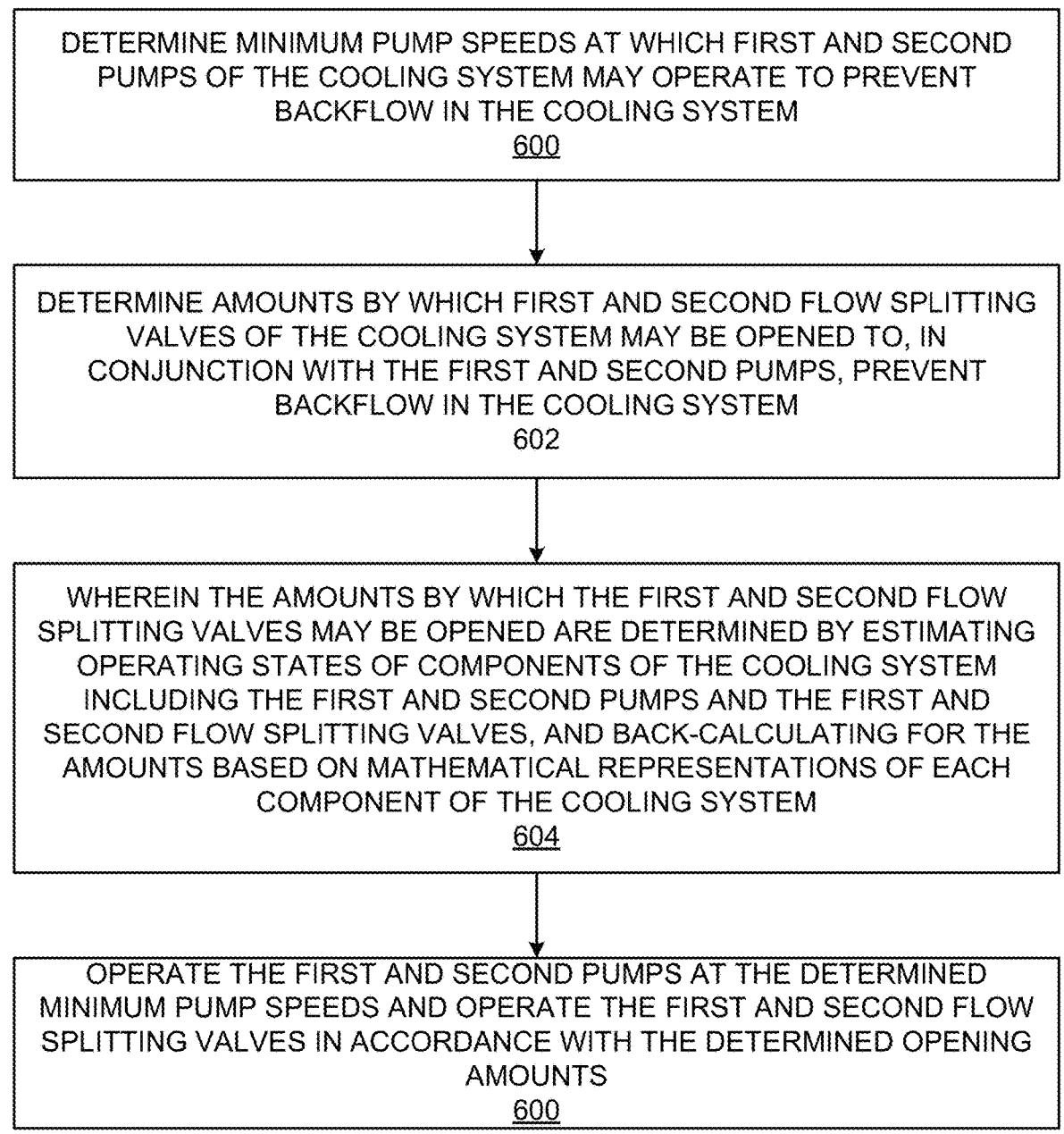
FIG. 6 is a flow chart illustrating example operations that can be performed to control a cooling system in accordance with some embodiments described in the present disclosure.

FIG. 6 illustrates example operations that may be performed to effectuate cooling system control in accordance with some embodiments. At operation 600, minimum pump speeds at which first and second pumps of the cooling system may operate to prevent backflow in the cooling system. As described above, control maps may be used to determine minimum pump speeds as a function of a three-way/flow splitting valve position and target flow rate (to prevent or avoid fluid back flow through a fuel cell stack), and determining a minimum pump speed as a function of three-way valve position (to prevent fluid back flow across a radiator path).

At operation 602, the amounts by which first and second flow splitting valves of the cooling system may be opened to, in conjunction with the first and second pumps, prevent backflow in the cooling system. That is, the output of each of the aforementioned control maps can be used to establish or set forth a lower limit saturation for a desired pump speed command. Again, if the pump speed is less than the backflow prevention minimum allowed pump speed, the pump speed is increased and set to the backflow prevention minimum allowed pump speed to overcome the pressure creating backflow.

At operation 604, the amounts by which the first and second flow splitting valves are determined by estimating operating states of components of the cooling system including the first and second pumps and the first and second flow splitting values. Moreover, back-calculation(s) can be performed to determine the amounts by the which the first and second flow splitting values may be opened based on mathematical representations of each component of model-based control design, where physical equations are used to represent components of the cooling system along with a state estimator that predicts the state of components/at every relevant location of the cooling system. The state information and the inverse of the aforementioned physical equations (where the physical equations represent a first system (in one/forward direction) and the inverse can be used to represent the second, parallel system (in the opposite/backward direction). In this way, target values at particular areas in the cooling system (e.g., target pressure at a pump inlet) can be achieved by back-calculating the pressure needed at an inlet of a corresponding fluid/coolant pump (via the state estimator) and plugged into the reverse equation for that pump. As explained above, state estimation and control are directly related, and thus, correct or accurate state estimates are needed to effectuate the correct or desired control.

At operation 606, the first and second pumps are operated at the determined minimum pump speeds and operate the first and second flow splitting valves in accordance with the determined opening amounts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7 Various embodiments are described in terms of this example-computing component 700 After reading this description, it will become apparent to a person skilled in the relevant art how to implement the application using other computing components or architectures.

Figure 7:
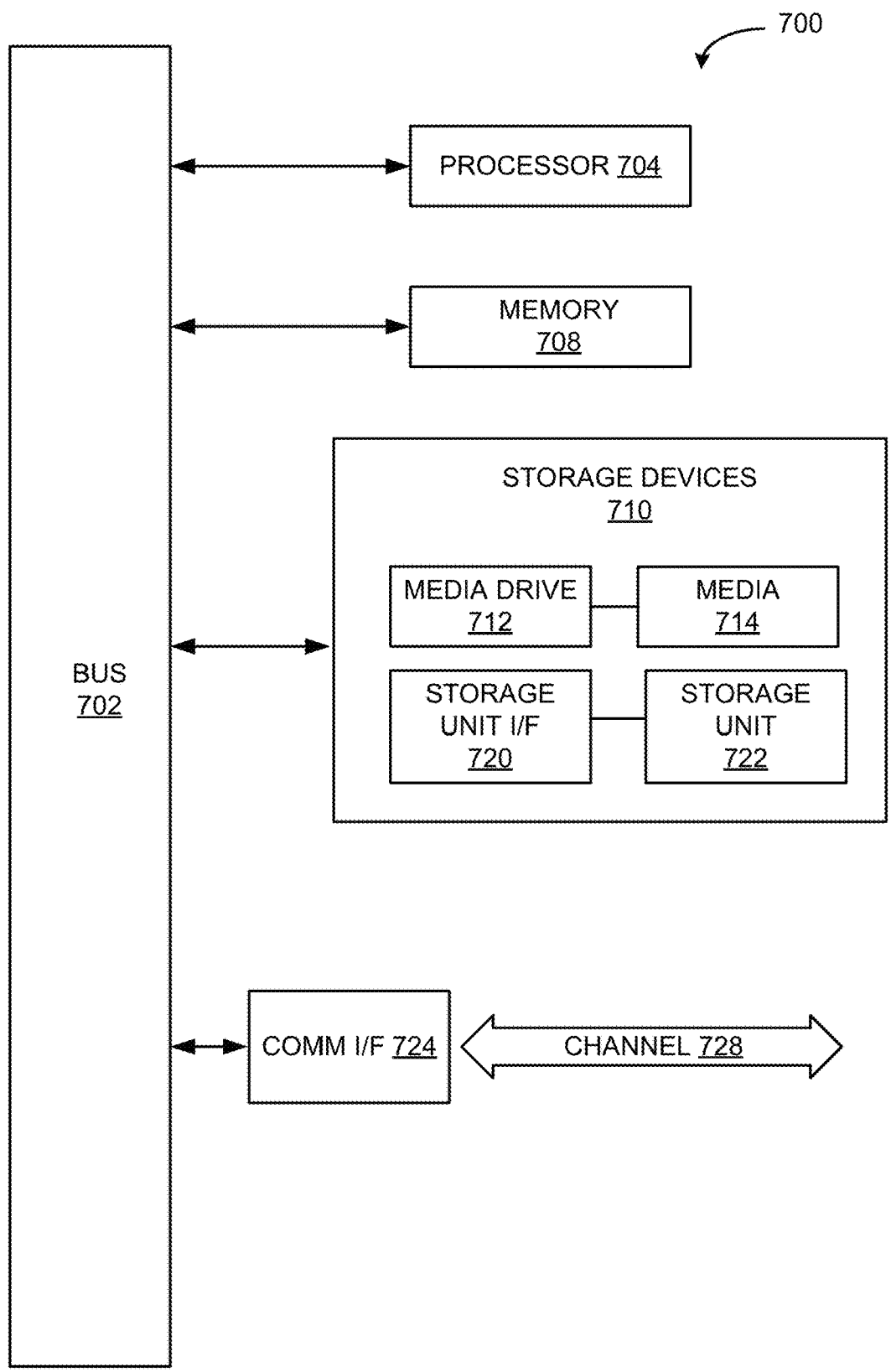
FIG. 7 is an example computing component that may be used to implement various features of embodiments described in the present disclosure.

Referring now to FIG. 7 computing component 700 may represent, for example, computing or processing capabilities found within computer processing units or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, electronic devices that might include some form of processing capability.

Computing component 700 might include, for example, one or more processors, controllers, control components, or other processing devices. This can include a processor, and/or any one or more of the components making up electronic control device 102 and/or its component parts, or other components or elements of vehicle 100, e.g., signal sensors, etc. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 504. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining minimum pump speeds at which first and second pumps of a cooling system may operate to prevent backflow in the cooling system;
   determining amounts by which first and second flow splitting valves of the cooling system may be opened to, in conjunction with the first and second pumps, prevent backflow in the cooling system, wherein:
   the amounts by which the first and second flow splitting valves may be opened are determined by estimating operating states of components of the cooling system including the first and second pumps and the first and second flow splitting valves, and back-calculating for the amounts based on at least one of: (a) mathematical representations of the components of the cooling system, or (b) values derived from the mathematical representations, and
   a respective mathematical representation comprises at least one of: (a) an equation used to represent physical characteristics of a respective component of the cooling system, or (b) a state estimator that predicts an operational state of the respective component; and
   operating the first and second pumps at the determined minimum pump speeds and operating the first and second flow splitting valves in accordance with the determined amounts by which first and second flow splitting valves of the cooling system may be opened.

2. The method of claim 1, wherein determining the minimum pump speeds is based upon first and second control maps.

3. The method of claim 2, wherein the first control map comprises a mapping of minimum allowed pump speeds as a function of flow splitting valve position and target flow rate to prevent backflow in a fuel cell path of the cooling system.

4. The method of claim 3, wherein the second control map comprises a mapping of minimum allowed pump speed as a function of flow splitting valve position to prevent backflow in a radiator path of the cooling system.

5. The method of claim 4, wherein the radiator path comprises a single radiator common to at least two fuel cells.

6. The method of claim 1, wherein the back-calculating comprises back-calculating a pressure needed at an inlet of a corresponding one of the first and second pumps.

7. The method of claim 6, further comprising using the back-calculated pressure needed at the inlet of the corresponding one of the first and second pumps as a basis for solving a reverse mathematical representation of the corresponding one of the first and second pumps.

8. The method of claim 1, further comprising adjusting the minimum pump speeds at which the first and second pumps of a cooling system may operate, and the amounts by which the first and second flow splitting valves of the cooling system may be opened based on feedforward and feedback control output values.

9. A system, comprising:
   one or more processors; and
   memory including instructions that when executed by the one or processors, cause the system to:
   determine minimum pump speeds at which first and second pumps may operate to prevent backflow in a cooling system, the first and second pumps pumping coolant through first and second fuel cell systems;
   determine amounts by which first and second flow splitting valves of the first and second fuel cell systems, respectively, may be opened to, in conjunction with the first and second pumps, prevent backflow within paths of the system defined relative to a single common radiator through which the coolant passes, wherein:
   the amounts by which the first and second flow splitting valves may be opened are determined by estimating operating states of the first and second pumps and the first and second flow splitting valves, and back-calculating for the amounts based on at least one of: (a) mathematical representations of each of the first and second pumps, the first and second flow splitting valves, and the single common radiator, and (b) values derived from the mathematical representations, and
   a respective mathematical representation comprises at least one of: (a) a physical equation used to represent physical characteristics of a respective component, and (b) a state estimator that predicts an operational state of the respective component; and
   operate the first and second pumps at the determined minimum pump speeds and operate the first and second flow splitting valves in accordance with the determined amounts by which first and second flow splitting valves of the cooling system may be opened.

10. The system of claim 9, wherein the instructions that when executed by the one or more processors cause the system to determine the minimum pump speeds, further cause the system to determine the minimum pump speeds based on a first control map comprising a mapping of minimum allowed pump speeds as a function of flow splitting valve position and target flow rate to prevent backflow.

11. The system of claim 9, wherein the instructions that when executed by the one or more processors cause the system to determine the minimum pump speeds, further cause the system to determine the minimum pump speeds based on a second control map comprising a mapping of minimum allowed pump speed as a function of flow splitting valve position to prevent backflow in a radiator path of the cooling system.

\* \* \* \* \*